United States Patent [19]

Huang

[11] Patent Number: 4,850,804
[45] Date of Patent: Jul. 25, 1989

[54] PORTABLE ELECTRIC FAN HAVING A UNIVERSALLY ADJUSTABLE MOUNTING

[75] Inventor: Jyh-Chian Huang, Los Angeles, Calif.

[73] Assignee: Tatung Company of America, Inc., Long Beach, Calif.

[21] Appl. No.: 206,946

[22] Filed: Jun. 13, 1988

Related U.S. Application Data

[63] Continuation of Ser. No. 882,309, Jul. 7, 1986, abandoned.

[51] Int. Cl.⁴ ............................................. F04D 29/60
[52] U.S. Cl. .................................. 416/246; 416/206; 248/278
[58] Field of Search ............... 416/246, 206, 247 R; 248/278, 289.1, 291, 231.5

[56] References Cited

U.S. PATENT DOCUMENTS

| | | | |
|---|---|---|---|
| 782,816 | 2/1905 | Becker | 248/278 |
| 1,670,056 | 5/1928 | Winters | 416/246 |
| 2,022,028 | 11/1935 | Cornell, Jr. | 416/246 |
| 2,433,314 | 12/1947 | White | 248/231.5 |
| 2,510,181 | 6/1950 | Jury | 248/231.5 |
| 2,634,905 | 4/1953 | Reisch | 416/100 |
| 3,000,599 | 9/1961 | Honig | 248/278 |
| 3,147,639 | 9/1964 | Braskamp | 416/100 |
| 4,687,170 | 8/1987 | Beaver | 248/278 |

FOREIGN PATENT DOCUMENTS

| | | | |
|---|---|---|---|
| 1031687 | 6/1953 | France | 416/246 |
| 261132 | 11/1928 | Italy | 416/246 |
| 304572 | 12/1933 | Italy | 416/246 |

Primary Examiner—Robert E. Garrett
Assistant Examiner—John T. Kwon
Attorney, Agent, or Firm—Gene W. Arant; Matthew F. Jodziewicz

[57] ABSTRACT

An electric fan has a universally adjustable mounting which includes a vertical stem rotatable in a pedestal, and a pair of support joints extending above the stem and pivotal in mutually perpendicular planes. It is therefore possible to position the fan in lateral displacement from the stem, such that its back thrust creates a torque force tending to rotate the stem. The stem at its lower end has a base plate parallel to the pedestal. A pair of ball-and-spring mechanisms located between the base plate and pedestal permit the stem to be manually rotated to a selected position of adjustment where the balls engage a corresponding pair of holes. Yet the spring strength is sufficient to resist the torque produced by operation of the fan.

5 Claims, 1 Drawing Sheet

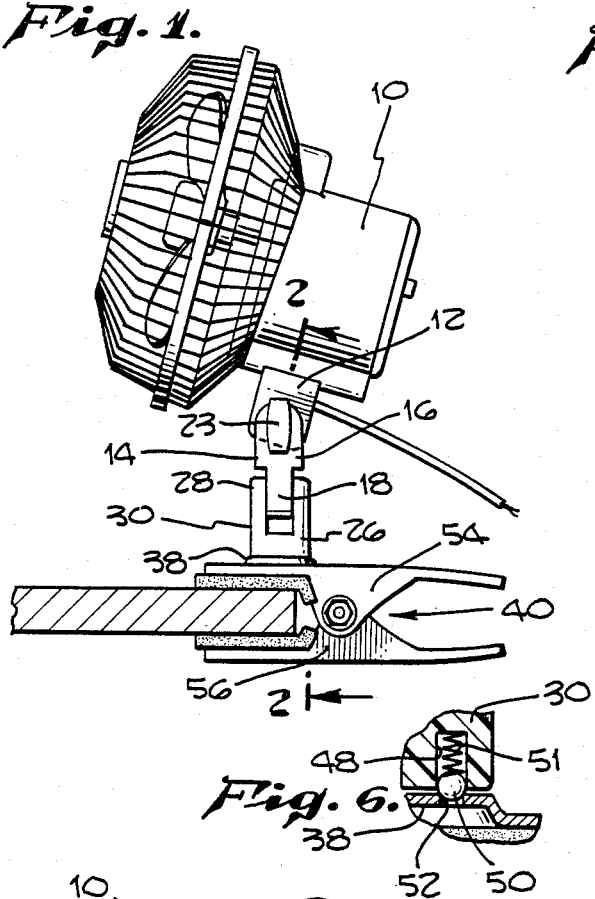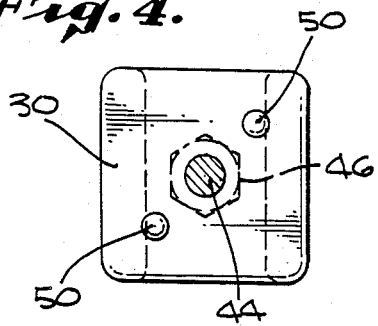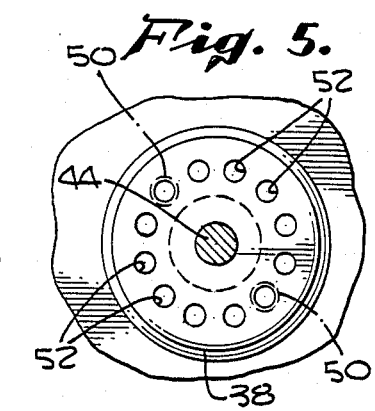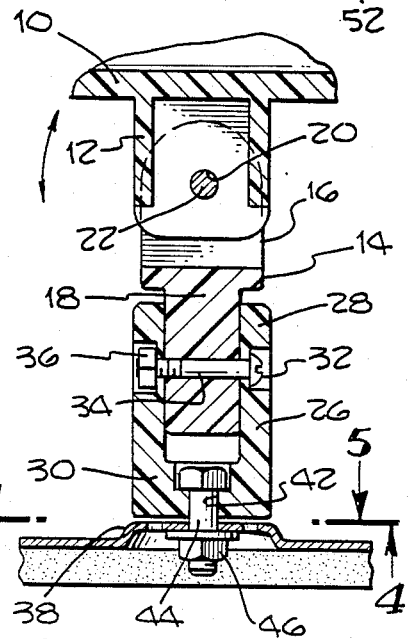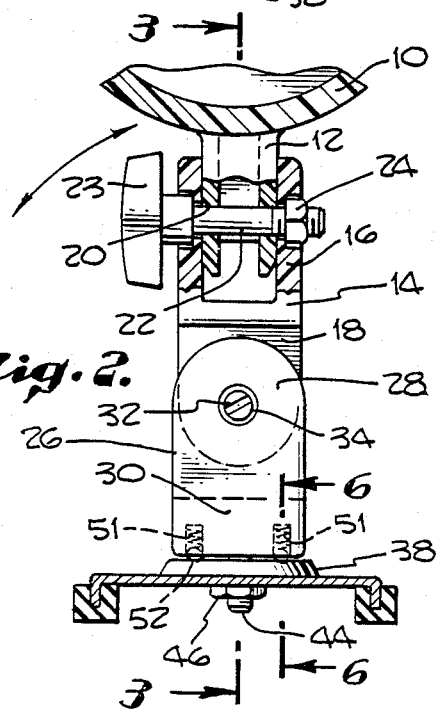

PORTABLE ELECTRIC FAN HAVING A UNIVERSALLY ADJUSTABLE MOUNTING

This is a continuation of co-pending application Ser. No. 06/882,309 filed on July 7, 1986, now abandoned.

BACKGROUND OF THE INVENTION

1. FIELD OF THE INVENTION

This invention relates to universally adjustable mountings for use with portable appliances and the like and more particularly to a portable electric fan having a universally adjustable mounting.

2. DESCRIPTION OF RELATED ART

Prior to this invention, small portable appliances, such as fans, could not be successfully provided with a universally adjustable mounting that would compensate for the forces and torques produced by the action of the appliances. It was a common happenstance that a prior art portable fan having a universally adjustable mounting wold be positioned by a user only to move from the selected position once the fan was activated due to the forces and torques produced by the fan motor and blades. A user then would have to repeatedly readjust the universal mounting to reposition the fan unit while the universal mountings are old in the art, they rely mostly on compressive frictional forces or flexible stems for positional flexibility and have failed to overcome the problem discussed above.

The present invention provides an arrangement of spring biased ball bearings, a corresponding plurality of holes, and both compressive frictional and clamping means to solve the positioning problem noted previously.

The working interaction of the spring biased ball bearings and corresponding plurality of holes provides for a discrete number of positional possibilities for the mounting. In the present invention a force or torque greater than that produced by the associated appliance is required to move from one discrete position to another. Yet, this arrangement permits a user to manually exert sufficient force to select any one of the discrete positional possibilities that satisfies the user's demands.

When the discrete positional nature of the mounting is combined with the compressive frictional and clamping means of the invention, a universally adjustable mounting for use with portable appliances is provided overcoming the inadequacies of existing prior art universally adjustable mountings.

OBJECTS AND SUMMARY OF THE INVENTION

It is an object of the present invention to provide a universally adjustable mounting for use with portable appliances and the like.

It is another object of the present invention to provide a portable fan having a universally adjustable mounting.

It is still another object of the present invention to provide mounting that would compensate for the forces and torques produced by the action of the fan tending to move the fan from its pre-selected position.

It is still another object of the invention to provide a portable fan with a universally adjustable mounting which is simple in construction, inexpensive to manufacture and operate, strong, durable and efficient in operation and service.

In an exemplary embodiment of the invention with a portable electric fan having a universally adjustable mounting, the invention is directed to a fan having a protruding portion, and a knee joint member having a fork shaped end and a base end, the fork shaped end is adapted to receive the protruding portion of the fan. Means for releasably connecting in a selectively positionable adjustable manner the forked shaped end of the knee joint member to the protruding portion of the fan is also provided. A connecting strut member having a first fork shaped end and a second opposite base end is also provided where the first fork shaped end of the connecting strut member is adapted to receive the base end of the knee joint member. Means for releasably connecting in a selectively positionable adjustable manner the first fork shaped end of the connecting strut member to the base end of the knee joint member is operatively connected to the members. Means for rotatably connecting the second opposite base end of the connecting strut to a generally flattened surface portion of a clamping member is also provided. The second opposite base end of the connecting strut having at least one recess therein is adapted to receive and retain a spring biased ball bearing disposed between the second opposite base end of the connecting strut and the generally flattened surface portion of the clamping member, the generally flattened surface portion of the clamping member has a plurality of holes having a diameter less than that of the ball bearing and aligned to partially receive the ball bearing.

These and other objects of the invention will become more apparent from the hereinafter following commentary taken in conjunction with the following Figures of Drawings.

BRIEF DESCRIPTION OF THE DRAWINGS

In the drawings, FIG. 1 is a side perspective view of a portable electric fan having a universally adjustable mounting constructed in accordance with the invention herein;

FIG. 2 is a view taken along line 2—2 of FIG. 1;
FIG. 3 is a view taken along line 3—3 of FIG. 2;
FIG. 4 is a view taken along line 4—4 of FIG. 3;
FIG. 5 is a partial view taken along line 5—5 of FIG. 3; and,
FIG. 6 is a partial view taken along line 6—6 of FIG. 2.

DESCRIPTION OF THE BEST EMBODIMENTS CONTEMPLATED

Referring to the Figures of the Drawings wherein like numbers of reference designate like elements throughout, it will be noted that in a preferred embodiment of the invention for use as a portable electric fan having a universally adjustable mounting, the invention comprises a fan unit 10 having a protruding portion 12 on its housing.

A knee joint member 14 has a fork shaped end 16 and a base end 18, with fork shaped end 16 being adapted to receive protruding portion 12 of fan unit 10.

Fork shaped end 16 and protruding portion 12 of fan unit 10, each has a passageway 20 aligned to receive a first threaded bolt 22 therethrough. A first nut 24 is threadably mated with first threaded bolt 22 to retain protruding portion 12 of fan unit 10 and fork shaped end 16 of knee joint member 14 in a releasable, selectively positionable compressive relationship.

Wing nut head 23 may be used with first threaded bolt 22 to facilitate tightening and loosing of these two members by hand for positioning by the user.

A connecting strut member or stem 26 has a first fork shaped end 28 and a second opposite base end 30. First fork shaped end 28 of connecting strut member 26 is adapted to receive base end 18 of knee joint member 14.

First fork shaped end 28 of connecting strut member 26 and base end 18 of knee joint member 14 each has a passageway 32 aligned to receive a second threaded bolt 34 therethrough. A second nut 36 is threadably mated with second threaded bolt 34 to retain the first fork shaped end 28 of connecting strut member 26 and base end 18 of knee joint member 14 in a releasable, selectively positionable compressive relationship.

The stem or connecting strut member 26 is rotatably connected to a pedestal formed by a generally flattened surface portion 38 of a clamp member 40. Flattened surface portion 38 and base end 30 of stem 26 has a passageway aligned to receive a third threaded bolt 44 therethrough. A third nut 46 is threadably mated with third threaded bolt 44 to hold second opposite base end 30 of connecting strut 26 in vertically spaced relation to generally flattened surface portion 38 of clamping member 40 in a releasable, rotatable relationship.

Second opposite base end 30 of connecting strut 26 has two recesses 48 formed in its flat under surface. Each recess is adapted to receive and retain a spring 51 biasing a ball bearing 50 disposed between the flat under surface of base end 30 of connecting strut member 26 and generally flattened surface portion 38 of clamping member 40.

Generally flattened surface portion 38 of clamping member 40 has a plurality of holes 52 arranged in a generally circular pattern and each having a diameter less than that of ball bearings 50 and aligned to partially receive ball bearings 50 therein.

Clamping member 40 has a pair of connected spring biased opposing jaws 54 and 56 respectively.

In use, the compressive frictional relation of the mounting members permits a continuous adjustment of the fan's position in two axes of movement. The rotating relation of the mounting members, however, is limited to a discrete number of positions as provided for by the spring biased ball bearings and generally circular plurality of holes in the generally flattened surface portion of the clamping member. The biasing springs are chosen so that the torque forces produced by the fan while in operation, are insufficient to overcome the retaining forces created by the springs biasing the ball bearings to remain in the holes. Thus, while a user can exert by hand sufficient force to rotate the mounting, operation of the fan will not produce sufficient forces to move the mounting's original positioning, and the fan, once so positioned, will remain in such original position.

The invention described above is, of course, susceptible to many variation, modifications and changes, all of which are within the skill of the art. It should be understood that all such variation, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

I claim:

1. In a universally adjustable fan assembly including a pedestal, a stem rising vertically upward from said pedestal and rotatable therein, a pair of support joints extending in serial relation above said stem and pivotal in mutually perpendicular vertical planes, and an electrical fan supported from the uppermost one of said support joints, the improvements comprising:

said pedestal having upwardly facing flat surface with a number of holes therein which are arranged in a circular pattern concentric to the vertical axis of said stem;

a base plate fixedly secured to said stem and rotatable therewith, said base plate having a flat under surface which extends circumferentially about the vertical axis of said stem, the lowermost end of said stem being secured to said pedestal against upward movement so that there is a fixed vertical space between said under surface of said base plate and said upwardly facing flat surface of said pedestal;

said flat under surface of said base plate having a plurality of recesses thereien which are at the same radius distance from the vertical axis of said stem as said holes, said recesses being arranged symmetrically with respect to said stem and being adapted to register with successive sets of said holes when said stem and base plate are rotated relative to said pedestal;

a separate ball in the lower end of each of said recesses;

all of said holes being of somewhat smaller diameter than all of said balls so that said balls cannot fully enter said holes;

a separate spring within each of said recesses urging the corresponding ball downwardly so that said ball normally extends somewhat below said under surface of said base plate and in retaining engagement with a selected one of said holes; and said springs pressing the corresponding balls downwardly with sufficient force to reliably maintain a selected rotational position of said stem and base plate relative to said pedestal which is not overcome by torque forces resulting from operation of the fan when the positions of said pivot joints are such that the fan is laterally displaced from said stem, but which yet permits manual rotation of the pedestal and an to a different selected operating position.

2. A universally adjustable fan assembly as in claim 1, wherein said base plate with its recessed under surface is formed on the lower end of said stem, said stem having a central portion of reduced diameter which extends below said recessed under surface and is threaded; said pedestal having a central opening therein; and wherein said threaded portion of said stem extends through said central opening and has a nut fastened thereon for securing said sem in said pedestal.

3. A universally adjustable fan assembly as in Claim 1 wherein said base plate with its recessed under surface is formed on the lower end of said stem, said stem having a central portion of reduced diameter which extends below said recessed under surface and is threaded; which further includes a clamp for securing the fan assembly to a supporting object, said clamp having upper and lower jaws, separate resilient facing members secured to the two jaws, and said upper jaw having a raised portion forming said pedestal; said pedestal having a central opening therein; and wherein said threaded portion of said stem extends through said central opening and has a nut fastened thereon for securing said stem in said pedestal, said nut being housed within the raised portion of said upper jaw above the associated facing member so as to prevent said nut from damaging an object to which said clamp is fastened.

4. In a universally adjustable fan assembly including a pedestal, a stem rising vertically upward from said pedestal and rotatable therein, at least one support joint extending above said stem and pivotal in a vertical plane relative to said stem, and an electric fan supported from and above said at least one support joint, the improvement comprising;

said pedestal having an upwardly facing flat surface with a number of holes therein which are arranged in a circular pattern concentric to the vertical axis of said stem;

a base plate fixedly secured to said stem and rotatable therewith, said base plate having a flat under surface which extends circumferentially about the vertical axis of said stem, the lowermost end of said stem being secured to said pedestal against upward movement so that there is a fixed vertical space between said under surface of said base plate and said upwardly facing flat surface of said pedestal;

said flat under surface of said base plate having a plurality of recesses therein which are at the same radius distance from the vertical axis of said stem as said holes, said recesses being arranged symmetrically with respect to said stem and being adapted to register with successive sets of said holes when said stem and base plate are rotated relative to said pedestal;

a separate ball in the lower end of each of said recesses;

all of said holes being of somewhat smaller diameter than all of said balls so that said balls cannot fully enter said holes;

a separate spring within each of said recesses urging the corresponding ball downwardly so that said ball normally extends somewhat below said under surface of said base plate in retaining engagement with a selected one of said holes; and said springs pressing the corresponding balls downwardly with sufficient force to reliably maintain a selected rotational position of said stem and base plate relative to said pedestal which is not overcome by torque forces resulting from operation of the fan when the position of said at least one pivot joint is such that the fan is laterally displaced from said stem, but which yet permits manual rotation of the pedestal and fan to a different selected operating position.

5. In a universally adjustable fan assembly including a pedestal, a stem rising vertically upward from said pedestal and rotatable therein, at least one support joint extending above said stem and pivotal in a vertical plane relative to said stem, and an electric fan supported from and above said at least one support joint, the improvement comprising:

said pedestal having a central opening therein and having an upwardly facing flat surface with a number of holes therein which are arranged in a circular pattern concentric to the vertical axis of said stem;

said stem having a central portion of reduced diameter which extends downward through said central opening of said pedestal and is threaded beneath said pedestal and has a nut fastened thereon for securing said stem in said pedestal against upward movement;

said stem being of larger diameter above said pedestal and having a flat under surface extending circumferentially about the vertical axis of said stem above said pedestal such that there is a fixed vertical space between said flat under surface of said stem and said upwardly facing flat surface of said pedestal;

said flat under surface of said stem having a plurality of recesses therein which are at the same radius distance from the vertical axis of said stem as said holes, said recesses being arranged symmetrically with respect to said stem and being adapted to register with successive sets of said holes when said stem and base plate are rotated relative to said pedestal;

a separate ball in the lower end of each of said recesses;

all of said holes being of somewhat smaller diameter than all of said balls so that said balls cannot fully enter said holes;

a separate spring within each of said recesses urging the corresponding ball downwardly so that said ball normally extends somewhat below said under surface of said base plate in retaining engagement with a selected one of said holes; and said springs pressing the corresponding balls downwardly with sufficient force to reliably maintain a selected rotational position of said stem and base plate relative to said pedestal which is not overcome by torque forces resulting from operation of the fan when the position of said at least one pivot joint is such that the fan is laterally displaced from said stem, but which yet permits manual rotation of the pedestal and fan to a different selected operating position.

* * * * *